(12) United States Patent
Yamaguchi et al.

(10) Patent No.: US 10,407,565 B2
(45) Date of Patent: Sep. 10, 2019

(54) METHOD FOR EXTRACTING LATEX, METHOD FOR CULTIVATING PLANT OF ASTERACEAE FAMILY, METHOD FOR PRODUCING PNEUMATIC TIRE, AND METHOD FOR PRODUCING RUBBER PRODUCT

(71) Applicant: SUMITOMO RUBBER INDUSTRIES, LTD., Kobe-shi, Hyogo (JP)

(72) Inventors: Haruhiko Yamaguchi, Kobe (JP); Chiharu Tani, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 210 days.

(21) Appl. No.: 15/013,662

(22) Filed: Feb. 2, 2016

(65) Prior Publication Data

US 2016/0237254 A1   Aug. 18, 2016

(30) Foreign Application Priority Data

Feb. 17, 2015  (JP) ................. 2015-028842

(51) Int. Cl.
*C08L 7/02* (2006.01)
*B29D 30/06* (2006.01)
*A01G 23/10* (2006.01)
*B29K 7/00* (2006.01)
*B29K 105/00* (2006.01)

(52) U.S. Cl.
CPC .............. *C08L 7/02* (2013.01); *A01G 23/10* (2013.01); *B29D 30/0601* (2013.01); *B29K 2007/00* (2013.01); *B29K 2105/258* (2013.01)

(58) Field of Classification Search
CPC ....... C08L 7/02; A01G 23/10; B29D 30/0601; C08J 3/26
See application file for complete search history.

(56) References Cited

U.S. PATENT DOCUMENTS

2011/0010991 A1* 1/2011 Fujii ................. A01G 9/104
                                                            47/66.7
2011/0253285 A1* 10/2011 Ichikawa .............. B60C 1/0016
                                                            152/564

FOREIGN PATENT DOCUMENTS

JP    2010-142173 A   7/2010
JP    2012-126866 A   7/2012

OTHER PUBLICATIONS

Buranov, Anvar U., et. al., "Extraction and Characterization of Latex and Natural Rubber from Rubber-Bearing Plants", J. Agric. Food Chem. 2010, 58, 734-743, accessed at pubs.acs.org/JAFC on Nov. 6, 2017. (Year: 2010).*

(Continued)

*Primary Examiner* — Anthony Calandra
*Assistant Examiner* — Jamel M Nelson
(74) *Attorney, Agent, or Firm* — Birch, Stewart, Kolasch & Birch, LLP

(57) ABSTRACT

The present invention provides a method for extracting latex from a plant of the Asteraceae family and a method for cultivating a plant of the Asteraceae family, which allow such plants to be reused. The present invention relates to a method for extracting latex including a cutting step of cutting roots of a plant of the Asteraceae family in such a manner that the roots are partly left on the plant.

13 Claims, 2 Drawing Sheets

Before cutting leaves

(56) References Cited

OTHER PUBLICATIONS

Swearingen, J., et. al., "Dandelion", 2016 Invasive Plant Atlas of the United States. University of Georgia Center for Invasive Species and Ecosystem Health accessed at invasiveplantatlas.org on Nov. 6, 2017. (Year: 2010).*
English Machine translation for JP-2010-142173-A, dated Jul. 1, 2010.
Author Unknown. Correspondence from Research Institute [online], Published on Jun. 3, 2013, Archive distribution on Sep. 14, 2014, Internet<URL, https://www.heeen.net/main/kt/2013/kt238.html>.
Cornish, Katrina Ph.D. (author), "Cultural practices and alternate rubber biosynthesis, yield and quality" (title), pp. 1-41 (pages), Feb. 6, 2013 (date), public presentation and handouts from Tire Technology Conference, Koln, Germany (printed presentation); The Ohio State University, Ohio Agricultural Research and Development Center, 1680 Madison Avenue, Wooster, OH 44691-4096 (available at, publisher and place).†
Kopicky, Stephen Edward (author), Master's Thesis, "The Use of Near Infrared Spectroscopy in Rubber Quantification" (title), 144 pages, specifically Chapter 4, pp. 67-90 (pages), May 2014 (date), The Graduate School of The Ohio State University; 1680 Maaison Avenue, Wooster, OH 44691-4096 (publisher and place of publication), available at https://etd.ohiolink.edu/pg_6?107206593300685:P0_SEARCH:NO.†

\* cited by examiner
† cited by third party

Before cutting leaves

After cutting leaves

Boundary between stems and roots

METHOD FOR EXTRACTING LATEX, METHOD FOR CULTIVATING PLANT OF ASTERACEAE FAMILY, METHOD FOR PRODUCING PNEUMATIC TIRE, AND METHOD FOR PRODUCING RUBBER PRODUCT

TECHNICAL FIELD

The present invention relates to a method for extracting latex, a method for cultivating a plant of the Asteraceae family, a method for producing a pneumatic tire, and a method for producing a rubber product.

BACKGROUND ART

Extraction of latex from *Taraxacum kok-saghyz* (Russian dandelion), a plant of the Asteraceae family, has been tried. For example, Patent Literature 1 discloses that latex yield can be increased by application of jasmonic acid or a derivative thereof to *Taraxacum kok-saghyz*.

However, the method for extracting latex and the method for cultivating *Taraxacum kok-saghyz* have not been investigated in detail.

CITATION LIST

Patent Literature

Patent Literature 1: JP 2010-142173 A

SUMMARY OF INVENTION

Technical Problem

Extraction of latex from *Taraxacum kok-saghyz* is commonly accomplished by crushing the roots followed by extraction with an organic solvent. With this method, the plant individuals from which latex has once been extracted cannot be reused. In other words, latex cannot be extracted repeatedly from the same plant individuals of the Asteraceae family.

The present invention aims to solve the above problem and provide a method for extracting latex from a plant of the Asteraceae family and a method for cultivating a plant of the Asteraceae family, which allow such plants to be reused.

Solution to Problem

The present inventors have studied intensively to find out that, in the extraction of latex from the roots cut from *Taraxacum kok-saghyz*, latex can hardly be extracted from the roots near the ground, while a large amount of latex can be extracted from the tip portions of the roots. Based on this finding, they have tried to regenerate the plant by intentionally leaving the roots near the ground, which show poor latex extraction efficiency, on the plant in the extraction of latex, and replanting the plant with the roots near the ground left thereon in soil. In this case, the water absorption of the plant can be reduced because the roots have been cut in the extraction of latex. To overcome this problem, the present inventors have found out that a plant of the Asteraceae family whose roots have been cut can be suitably cultivated again by cultivating the thus cut plant under conditions where the plant has been subjected to a treatment of suppressing transpiration. Specifically, for example, the leaves at the center above the ground are left on the plant while the other leaves are cut and removed to suppress the transpiration of water in the plant. This treatment allows the plant of the Asteraceae family whose roots have been cut to be suitably cultivated. Then, the present inventors have also confirmed that latex can be extracted again from the plant of the Asteraceae family re-cultivated after cutting of the roots, thereby completing the present invention.

Specifically, the present invention relates to a method for extracting latex, including a cutting step of cutting roots of a plant of the Asteraceae family in such a manner that the roots are partly left on the plant.

The cutting step preferably includes cutting the roots in such a manner that each root left on the plant has a length of 5.0 cm or less.

The plant of the Asteraceae family is preferably a plant of the genus *Teraxacum*.

The plant of the Asteraceae family is preferably *Taraxacum kok-saghyz*.

The present invention also relates to a method for cultivating a plant of the Asteraceae family, including: a cutting step of cutting roots of a plant of the Asteraceae family in such a manner that the roots are partly left on the plant; and a transpiration-suppressed cultivation step of cultivating the plant whose roots have been cut in the cutting step under conditions where the plant has been subjected to a treatment of suppressing transpiration.

The cutting step preferably includes cutting the roots in such a manner that each root left on the plant has a length of 5.0 cm or less.

The treatment of suppressing transpiration is preferably carried out by cutting leaves.

The treatment of suppressing transpiration is preferably carried out by cutting leaves in such a manner that each leaf left on the plant has a length of 2.0 to 4.0 cm.

The transpiration-suppressed cultivation step is preferably carried out at a cultivation temperature of 16° C. to 30° C.

The transpiration-suppressed cultivation step is preferably carried out with an illuminance at the level of leaves set to 7000 to 20000 lx.

The transpiration-suppressed cultivation step is preferably carried out with a photoperiod of 12 hours or longer.

The plant of the Asteraceae family is preferably a plant of the genus *Teraxacum*.

The plant of the Asteraceae family is preferably *Taraxacum kok-saghyz*.

The present invention also relates to a method for producing a pneumatic tire, including: a kneading step of kneading rubber prepared from latex obtained by the method for extracting latex with additives to give a kneaded mixture; a raw tire formation step of forming a raw tire from the kneaded mixture; and a vulcanization step of vulcanizing the raw tire.

The present invention also relates to a method for producing a rubber product, including: a kneading step of kneading rubber prepared from latex obtained by the method for extracting latex with additives to give a kneaded mixture; a raw rubber product formation step of forming a raw rubber product from the kneaded mixture; and a vulcanization step of vulcanizing the raw rubber product.

Advantageous Effects of Invention

The method for extracting latex of the present invention includes a cutting step of cutting roots of a plant of the Asteraceae family in such a manner that the roots are partly left on the plant. In this method, latex is extracted from the root-tip portions, from which a large amount of latex can be extracted, which results in high latex extraction efficiency. Further, since the roots are cut in such a manner that the roots are partly left on the plant, the plant whose roots have been cut in the cutting step can be cultivated again to reuse the plant.

The method for cultivating a plant of the Asteraceae family of the present invention includes a cutting step of cutting roots of a plant of the Asteraceae family in such a manner that the roots are partly left on the plant, and a transpiration-suppressed cultivation step of cultivating the plant whose roots have been cut in the cutting step under conditions where the plant has been subjected to a treatment of suppressing transpiration. In this method, by cultivating the plant whose roots have been cut in the cutting step under conditions where the plant has been subjected to a treatment of suppressing transpiration, it is possible to continuously cultivate the plant even if the water absorption of the plant is reduced due to the root cutting, and therefore to reuse the plant. This means that latex can be extracted repeatedly from the same plant individuals of the Asteraceae family, and thus the amount of latex extracted per individual can be increased by the multiple extraction of latex from a single individual.

Cultivating plants of the Asteraceae family from seeds until they have grown to allow for the extraction of latex requires a considerably long period of time. In the case of *Taraxacum kok-saghyz*, for example, it takes three months or longer. According to the present invention, plants whose roots have been cut, i.e., plants from which latex has once been extracted can be cultivated again and, therefore, the period required to permit the extraction of latex can be reduced compared to when plants are cultivated from seeds.

The method for producing a pneumatic tire of the present invention includes: a kneading step of kneading rubber prepared from latex obtained by the method for extracting latex of the present invention with additives to give a kneaded mixture; a raw tire formation step of forming a raw tire from the kneaded mixture; and a vulcanization step of vulcanizing the raw tire. In this method, since pneumatic tires are produced from latex obtained by a latex extraction process with high extraction efficiency, plant resources can be used efficiently and, therefore, environment-friendly pneumatic tires can be produced.

The method for producing a rubber product of the present invention includes: a kneading step of kneading rubber prepared from latex obtained by the method for extracting latex of the present invention with additives to give a kneaded mixture; a raw rubber product formation step of forming a raw rubber product from the kneaded mixture; and a vulcanization step of vulcanizing the raw rubber product. In this method, since rubber products are produced from latex obtained by a latex extraction process with high extraction efficiency, plant resources can be used efficiently and, therefore, environment-friendly rubber products can be produced.

DESCRIPTION OF EMBODIMENTS

Figure 1:
FIG. 1 is a photograph showing an example of *Taraxacum kok-saghyz* before cutting of the leaves.

The method for extracting latex of the present invention includes a cutting step of cutting roots of a plant of the Asteraceae family in such a manner that the roots are partly left on the plant.

The method for cultivating a plant of the Asteraceae family of the present invention includes a cutting step of cutting roots of a plant of the Asteraceae family in such a manner that the roots are partly left on the plant, and a transpiration-suppressed cultivation step of cultivating the plant whose roots have been cut in the cutting step under conditions where the plant has been subjected to a treatment of suppressing transpiration.

The plant of the Asteraceae family to which the methods (method for extracting latex, method for cultivating a plant of the Asteraceae family) of the present invention are applicable is not particularly limited, and examples include plants of the genus *Sonchus*, plants of the genus *Solidago*, plants of the genus *Helianthus*, plants of the genus *Taraxacum*, and plants of the genus *Lactuca*.

Examples of plants of the genus *Sonchus* include *Sonchus oleraceus*, *Sonchus aspen*, *Sonchus brachyotus*, and *Sonchus arvensis*.

Examples of plants of the genus *Solidago* include *Solidago altissima*, *Solidago virgaurea* subsp. *asiatica*, *Solidago virgaurea* subsp. *leipcarpa*, *Solidago virgaurea* subsp. *leipcarpa f. paludosa*, *Solidago virgaurea* subsp. *gigantea*, and *Solidago gigantea* Ait. var. *leiophylla* Fernald.

Examples of plants of the genus *Helianthus* include *Helianthus annuus*, *Helianthus argophyllus*, *Helianthus atrorubens*, *Helianthus debilis*, *Helianthus decapetalus*, and *Helianthus giganteus*.

Examples of plants of the genus *Taraxacum* include dandelion (*Taraxacum*), *Taraxacum venustum* H. Koidz, *Taraxacum hondoense* Nakai, *Taraxacum platycarpum* Dahlst, *Taraxacum japonicum*, *Taraxacum officinale* Weber, *Taraxacum kok-saghyz*, and *Taraxacum brevicorniculatum*.

Examples of plants of the genus *Lactuca* include *Lactuca sativa* and *Lactuca indica*.

The methods (method for extracting latex, method for cultivating a plant of the Asteraceae family) of the present invention can be suitably applied to plants of the genus *Taraxacum*, and more suitably to *Taraxacum kok-saghyz*, among others.

(Method for Extracting Latex)

First, a description is given on the method for extracting latex.

The method for extracting latex of the present invention includes a cutting step of cutting roots of a plant of the Asteraceae family in such a manner that the roots are partly left on the plant.

<Cutting Step>

In the cutting step, roots of a plant of the Asteraceae family are cut in such a manner that the roots are partly left on the plant.

In the case of young plants, only a small amount of latex can be extracted from the cut roots. For this reason, the plant of the Asteraceae family to be subjected to the cutting step is preferably an adult plant which has grown to some extent. The plant may be a soil-grown or hydroponically grown plant.

Roots of the plant may be cut by any method, such as by using scissors, a knife or the like.

The cutting of roots is preferably carried out by cutting the roots in such a manner that each root left on the plant has a length of 5.0 cm or less, more preferably 4.0 cm or less, still more preferably 3.5 cm or less. If the length is more than 5.0 cm, the amount of extracted latex may be reduced. Also, the roots are preferably cut in such a manner that each root left on the plant has a length of 2.0 cm or more, more preferably 2.5 cm or more, still more preferably 2.8 cm or more. If the length is less than 2.0 cm, the plant whose roots have been cut cannot absorb water sufficiently and is more likely to die. As a result, the plant may not be reused.

Figure 3:
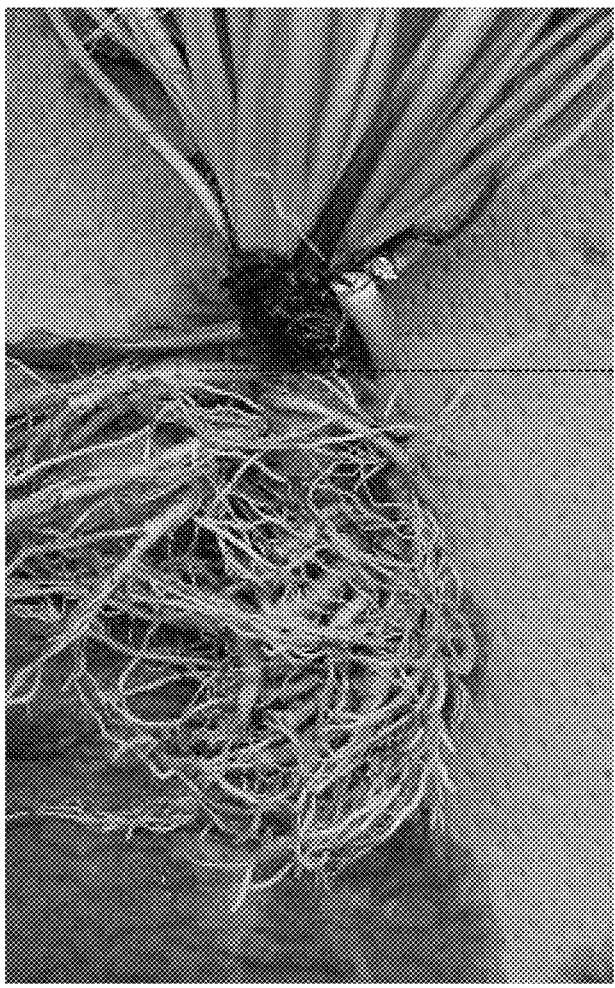
FIG. 3 is a photograph showing an example of a boundary between the stems and the roots.

The length of the root left on the plant as used herein refers to the length from the boundary between the stems and the roots to the tip of the root. FIG. 3 shows a line extrapolated from the boundary between the stems and the roots.

In the root cutting, each root may be cut at only one place or cut sequentially at plural places from the tip of the root toward the above-ground part.

<Latex Extraction Step>

In the latex extraction step, latex is extracted from the cut roots. For example, emulsion oozing out from the cut portions of the roots may be collected. In this case, cutting of the roots and extraction of latex are preferably repeated sequentially starting from the tips of the roots toward the above-ground part in order to increase the amount of extracted latex. The oozing emulsion may be collected by any method and, for example, it may be collected as appropriate using a tool such as a spatula.

Of course, latex may be extracted by crushing the cut roots followed by extraction with an organic solvent. Collecting of the oozing emulsion, however, allows latex with less impurities to be extracted efficiently compared to the extraction method using an organic solvent.

The method used in the extraction of latex may be determined as appropriate depending on whether priority is given to the extraction amount or the quality.

(Method for Cultivating Plant of Asteraceae Family)

A description is now given on the method for cultivating a plant of the Asteraceae family.

The method for cultivating a plant of the Asteraceae family of the present invention includes a transpiration-suppressed cultivation step of cultivating the plant whose roots have been cut in the cutting step under conditions where the plant has been subjected to a treatment of suppressing transpiration.

<Transpiration-suppressed Cultivation Step>

In the transpiration-suppressed cultivation step, the plant whose roots have been cut in the cutting step is cultivated under conditions where the plant has been subjected to a treatment of suppressing transpiration.

Since the plant whose roots have been cut in the cutting step has a reduced water absorption due to the root cutting, for continuous cultivation, the plant needs to be cultivated under conditions where the plant has been subjected to a treatment of suppressing transpiration to reduce the transpiration of water in the plant.

Any treatment of suppressing transpiration may be used, such as for example the use of an anti-transpirant or cutting leaves. However, the use of an anti-transpirant may cause leaf scorch (a phenomenon that leaf cells die due to the accumulation of heat in leaves resulting from insufficient transpiration). Hence, a treatment of cutting leaves is preferred to cultivate the plant more stably.

The treatment of suppressing transpiration may be performed before or after the cutting step.

The treatment of cutting leaves is not particularly limited. Leaves are preferably cut in such a manner that the leaves are partly left on the plant, and more preferably in such a manner that the leaves at the center, namely, the leaves in the vicinity of the boundary between the stems and the roots, are left on the plant.

In the cutting of leaves, the leaves are preferably cut in such a manner that each leaf left on the plant has a length of 2.0 to 4.0 cm, more preferably 2.5 to 3.5 cm. If the length is longer than 4.0 cm, the transpiration from the leaves can be greater than the water absorption from the roots and therefore the plant is more likely to dry and consequently die. Conversely, if the length is shorter than 2.0 cm, fast-growing young leaves may be damaged.

The concept of the "leaf" as used herein includes stems, and the length of the leaf left on the plant means the length from the boundary between the stems and the roots to the tip of the leaf.

In the transpiration-suppressed cultivation step, as long as the plant whose roots have been cut in the cutting step is cultivated under conditions where the plant has been subjected to a treatment of suppressing transpiration, other cultivation conditions and the like are not particularly limited. An example of other cultivation conditions is mentioned below.

In the transpiration-suppressed cultivation step, the cultivation temperature is preferably 16° C. to 30° C. The upper limit of the cultivation temperature is more preferably 26° C., still more preferably 23° C. If the cultivation temperature does not fall within the range mentioned above, the growth of the plant may be adversely affected.

In the transpiration-suppressed cultivation step, the illuminance at the level of the leaves is preferably 7000 to 20000 lx. The light source is not particularly limited, and it is sufficient to use a white fluorescent lamp. If the illuminance is less than 7000 lx, photosynthesis may be insufficient, resulting in an adverse effect on the growth of the plant. The illuminance of more than 20000 lx may also adversely affect the growth of the plant. It should be noted that, in the case of the conventional cultivation, the illuminance of 7000 to 8000 lx is enough.

In the transpiration-suppressed cultivation step, the photoperiod is preferably 12 hours or longer, more preferably 14 hours or longer. If the photoperiod is shorter than 12 hours, photosynthesis may be insufficient, resulting in an adverse effect on the growth of the plant. The upper limit of the photoperiod is not particularly limited, and is preferably 18 hours.

The photoperiod as used herein refers to the period of time during which the illuminance at the level of the leaves falls within the above preferred range per 24 hours.

In the transpiration-suppressed cultivation step, soil or hydroponic culture may be used. Preferred is soil culture because an appropriate pressure (stimulus) given to the roots promotes the formation of the main root that is a latex extraction part.

The transpiration-suppressed cultivation step allows the plant whose roots have been cut in the cutting step to be cultivated continuously.

Whether or not latex can be extracted again from the plant grown by the transpiration-suppressed cultivation step may be determined based on the number of expanded leaves formed after the cutting. Latex can be extracted again preferably when the number of expanded leaves reaches 10 or more, more preferably 30 or more.

Latex can be extracted repeatedly from the same plant individuals of the Asteraceae family by performing the cutting step and the latex extraction step again using the plant grown by the transpiration-suppressed cultivation step, namely, by repeating the cutting step, the latex extraction step, and the transpiration-suppressed cultivation step sequentially. Thus, the amount of latex extracted per individual can be increased by the multiple extraction of latex from a single individual.

(Method for Producing Rubber Product)

The method for producing a rubber product of the present invention includes: a kneading step of kneading rubber prepared from latex obtained by the method for extracting latex with additives to give a kneaded mixture; a raw rubber product formation step of forming a raw rubber product from the kneaded mixture; and a vulcanization step of vulcanizing the raw rubber product.

The rubber product is not particularly limited as long as it can be produced using rubber, and preferably natural rubber. Examples include pneumatic tires, rubber crawlers, rubber fenders, rubber gloves, and medical rubber tubes.

When the rubber product is a pneumatic tire, namely, when the method for producing a rubber product of the present invention is a method for producing a pneumatic tire of the present invention, the raw rubber product formation step and the vulcanization step correspond to a raw tire formation step of forming a raw tire from the kneaded mixture and a vulcanization step of vulcanizing the raw tire, respectively. Specifically, the method for producing a pneumatic tire of the present invention includes: a kneading step of kneading rubber prepared from latex obtained by the method for extracting latex with additives to give a kneaded mixture; a raw tire formation step of forming a raw tire from the kneaded mixture; and a vulcanization step of vulcanizing the raw tire.

<Kneading Step>

In the kneading step, rubber prepared from latex obtained by the method for extracting latex is kneaded with additives to give a kneaded mixture.

The rubber prepared from latex obtained by the method for extracting latex can be obtained by subjecting the latex extracted by the method for extracting latex to a coagulation step mentioned below.

<Coagulation Step>

The latex extracted by the method for extracting latex is subjected to a coagulation step. The coagulation method is not particularly limited, and examples include a method of adding latex to a solvent that does not dissolve polyisoprenoids (natural rubber), such as ethanol, methanol, or acetone, and a method of adding an acid to latex. Rubber (natural rubber) can be recovered as solids from the latex by the coagulation step. The obtained rubber (natural rubber) may optionally be dried before use.

Any additive may be used and additives used in the production of rubber products may be used. For example, in the case where the rubber product is a pneumatic tire, examples of the additive include rubber materials other than the rubber prepared from the latex, reinforcing fillers such as carbon black, silica, calcium carbonate, alumina, clay, and talc, silane coupling agents, zinc oxide, stearic acid, processing aids, various antioxidants, softeners such as oil, wax, vulcanizing agents such as sulfur, and vulcanization accelerators.

In the kneading step, a rubber kneading machine such as an open roll mill, Banbury mixer, or internal mixer may be used for kneading.

<Raw Rubber Product Formation Step (Raw Tire Formation Step in the Case of Tire)>

In the raw rubber product formation step, a raw rubber product (a raw tire in the case of a tire) is formed from the kneaded mixture obtained in the kneading step.

The raw rubber product may be formed by any method, and methods used in the formation of raw rubber products may be employed as appropriate. For example, when the rubber product is a pneumatic tire, the kneaded mixture obtained in the kneading step may be extruded into the shape of a tire component, formed on a tire building machine in a usual manner, and assembled with other tire components to build a raw tire (unvulcanized tire).

<Vulcanization Step>

In the vulcanization step, the raw rubber product obtained in the raw rubber product formation step is vulcanized to give a rubber product.

The raw rubber product may be vulcanized by any method, and methods used in the vulcanization of raw rubber products may be employed as appropriate. For example, when the rubber product is a pneumatic tire, the raw tire (unvulcanized tire) obtained in the raw rubber product formation step is vulcanized by heat pressing in a vulcanizer, thereby providing a pneumatic tire.

EXAMPLES

The present invention is specifically described with reference to, but not limited to, examples.

Seeds of *Taraxacum kok-saghyz* (KAZ08-015) were vernalized at 4° C. for two or more days, and then planted in soil.

After the planting, they were cultivated at 23° C. under a cycle of 16 hours light/8 hours dark for three months. The illuminance at the level of the leaves under the light conditions was kept at 7000 to 8000 lx. The illuminance at the level of the leaves under the dark conditions was kept at 1 lx or less.

The roots of the *Taraxacum kok-saghyz* grown for three months after seeding were cut and latex was extracted from the cut roots. The roots were cut at intervals of about 5 mm starting from the tips of the roots until each root left on the plant had a length of 3.0 cm, and latex was extracted from the cut roots.

The extracted latex was immersed in ethanol for five hours, so that natural rubber was coagulated.

The coagulated natural rubber was dried at room temperature overnight, and then measured for weight average molecular weight.

Figure 2:
FIG. 2 is a photograph showing an example of *Taraxacum kok-saghyz* planted in soil after cutting of the leaves.

The leaves of the *Taraxacum kok-saghyz* plants from which latex had been extracted were cut in such a manner that each leaf left on the plant had a length of 3.0 cm (see FIG. 2). After the cutting of leaves, the plants were again planted in the soil.

The re-planted *Taraxacum kok-saghyz* plants were cultivated again under the above conditions (23° C., photoperiod: 16 hours) for two months.

After the re-cultivation for two months, latex was extracted again from the roots in the same manner as described above. The extracted latex was treated in the same manner as described above, and the resulting natural rubber was measured for weight average molecular weight.

Comparative Example

For a comparison purpose, latex was extracted in the same manner as described above from the roots of *Taraxacum kok-saghyz* plants from which latex had not been extracted for five months after seeding. The extracted latex was treated as described above, and the resulting natural rubber was measured for weight average molecular weight.

The weight average molecular weight (polystyrene equivalent Mw) of the obtained rubbers was measured by gel permeation chromatography (GPC) under the conditions (1) to (7) mentioned below.
(1) Device: HLC-8020 produced by Tosoh Corporation
(2) Separation column: GMH-XL produced by Tosoh Corporation
(3) Measuring temperature: 40° C.
(4) Carrier: Tetrahydrofuran (5) Flow rate: 0.6 mL/min.
(6) Detector: differential refractometry, UV (215 nm)
(7) Molecular weight standards: polyisoprene standards, polystyrene standards The weight average molecular weight of the rubber extracted from the *Taraxacum kok-saghyz* plants from which latex had not been extracted for five months was about 2600000, while the weight average molecular weight of the rubber extracted from the re-cultivated *Taraxacum kok-saghyz* plants was about 2300000. This demonstrates that the rubber extracted from plants from which latex had already been extracted was equivalent to that of plants from which latex had never been extracted before.

Further, the amount of natural rubber prepared again from the plant from which latex had already been extracted (i.e., the amount of natural rubber obtained by the second extraction) was comparable to the amount of natural rubber prepared from the plant from which latex had never been extracted before (about 3 mg). This shows that the amount of latex extracted per individual can be increased by the multiple extraction of latex from a single individual.

The invention claimed is:

1. A method for cultivating a plant of the Asteraceae family, comprising:
    a cutting step of cutting roots of a plant of the Asteraceae family in such a manner that the roots are partly left on the plant after the plant has been removed from a soil or a hydroponic culture;
    a latex extraction step of extracting latex from the cut roots;
    a transpiration-suppressed cultivation step of cultivating the plant whose roots have been cut in the cutting step under conditions where the plant has been subjected to a treatment of suppressing transpiration;
    a step of replanting the plant whose roots have been cut in the cutting step; and
    a step of performing the cutting step and the latex extraction step again using the plant grown by the transpiration-suppressed cultivation step.

2. The method for cultivating a plant of the Asteraceae family according to claim 1, wherein the cutting step includes cutting the roots in such a manner that each root left on the plant has a length of 5.0 cm or less.

3. The method for cultivating a plant of the Asteraceae family according to claim 1, wherein the treatment of suppressing transpiration is carried out by cutting leaves.

4. The method for cultivating a plant of the Asteraceae family according to claim 1, wherein the treatment of suppressing transpiration is carried out by cutting leaves in such a manner that each leaf left on the plant has a length of 2.0 to 4.0 cm.

5. The method for cultivating a plant of the Asteraceae family according to claim 1, wherein the transpiration-suppressed cultivation step is carried out at a cultivation temperature of 16° C. to 30° C.

6. The method for cultivating a plant of the Asteraceae family according to claim 1, wherein the transpiration-suppressed cultivation step is carried out with an illuminance at the level of leaves set to 7000 to 20000 lx.

7. The method for cultivating a plant of the Asteraceae family according to claim 1, wherein the transpiration-suppressed cultivation step is carried out with a photoperiod of 12 hours or longer.

8. The method for cultivating a plant of the Asteraceae family according to claim 1, wherein the plant of the Asteraceae family is a plant of the genus *Teraxacum*.

9. The method for cultivating a plant of the Asteraceae family according to claim 5, wherein the plant of the Asteraceae family is *Taraxacum kok-saghyz*.

10. A method for producing a pneumatic tire, comprising:
    a cutting step of cutting roots of a plant of the Asteraceae family in such a manner that the roots are partly left on the plant after the plant has been removed from a soil or a hydroponic culture;
    a latex extraction step of extracting latex from the cut roots;
    a transpiration-suppressed cultivation step of cultivating the plant whose roots have been cut in the cutting step under conditions where the plant has been subjected to a treatment of suppressing transpiration;
    a step of replanting the plant whose roots have been cut in the cutting step;
    a step of performing the cutting step and the latex extraction step again using the plant grown by the transpiration-suppressed cultivation step;
    a step of preparing a rubber from the latex;
    a kneading step of kneading the rubber with additives to give a kneaded mixture;
    a raw tire formation step of forming a raw tire from the kneaded mixture; and
    a vulcanization step of vulcanizing the raw tire.

11. A method for producing a rubber product, comprising:
    a cutting step of cutting roots of a plant of the Asteraceae family in such a manner that the roots are partly left on the plant after the plant has been removed from a soil or a hydroponic culture;
    a latex extraction step of extracting latex from the cut roots;
    a transpiration-suppressed cultivation step of cultivating the plant whose roots have been cut in the cutting step under conditions where the plant has been subjected to a treatment of suppressing transpiration;
    a step of replanting the plant whose roots have been cut in the cutting step;
    a step of performing the cutting step and the latex extraction step again using the plant grown by the transpiration-suppressed cultivation step;
    a step of preparing a rubber from the latex;
    a kneading step of kneading the rubber with additives to give a kneaded mixture;
    a raw rubber product formation step of forming a raw rubber product from the kneaded mixture; and
    a vulcanization step of vulcanizing the raw rubber product.

12. The method for cultivating a plant of the Asteraceae family according to claim 2, wherein the cutting step includes cutting the roots in such a manner that each root left on the plant has a length of at least 2.5 cm.

13. The method for cultivating a plant of the Asteraceae family according to claim 1, wherein the treatment of suppressing transpiration is carried out by cutting leaves in such a manner that the leaves in the vicinity of the boundary between the stems and the roots are left on the plant.

* * * * *